(12) United States Patent
Schlachter et al.

(10) Patent No.: US 11,313,558 B2
(45) Date of Patent: Apr. 26, 2022

(54) CONSTANT EFFICIENCY CONTROLLER

(71) Applicant: Maxitrol Company, Southfield, MI (US)

(72) Inventors: John James Schlachter, Leonard, MI (US); Mark Geoffrey Masen, Leonard, MI (US); Frank P. Mimick, Watauga, TX (US); Nicholas Roth Hanawalt, Detroit, MI (US); Lynn E. Cooper, North Richland Hills, TX (US)

(73) Assignee: Maxitrol Company, Southfield, MI (US)

( * ) Notice: Subject to any disclaimer, the term of this patent is extended or adjusted under 35 U.S.C. 154(b) by 192 days.

(21) Appl. No.: 16/456,947

(22) Filed: Jun. 28, 2019

(65) Prior Publication Data

US 2019/0316775 A1    Oct. 17, 2019

Related U.S. Application Data

(63) Continuation of application No. 15/085,536, filed on Mar. 30, 2016, now abandoned.

(60) Provisional application No. 62/140,153, filed on Mar. 30, 2015.

(51) Int. Cl.
*F23N 5/18* (2006.01)
*F04D 27/00* (2006.01)
*F23N 1/02* (2006.01)
*F04D 25/08* (2006.01)

(52) U.S. Cl.
CPC ............. *F23N 5/184* (2013.01); *F04D 25/08* (2013.01); *F04D 27/004* (2013.01); *F23N 1/022* (2013.01)

(58) Field of Classification Search
None
See application file for complete search history.

(56) References Cited

U.S. PATENT DOCUMENTS

| | | | |
|---|---|---|---|
| 5,820,456 A | * | 10/1998 | Nelson ................... B05B 16/60 454/52 |
| 6,213,758 B1 | | 4/2001 | Tesar et al. |
| 6,329,783 B1 | | 12/2001 | Vrionis et al. |
| 6,864,659 B2 | | 3/2005 | Ratz et al. |
| 7,293,718 B2 | | 11/2007 | Sigafus et al. |
| 2008/0209807 A1 | | 9/2008 | Tsangaris et al. |
| 2010/0243928 A1 | | 9/2010 | Flick et al. |

* cited by examiner

*Primary Examiner* — Jason Lau
(74) *Attorney, Agent, or Firm* — Howard & Howard Attorneys PLLC

(57) ABSTRACT

A system and controller where the pressure of the air is continuously monitored or read at a designated exhaust point and adjustments made to the flow of the air and gas to keep the efficiency of the appliance at a maximum to control the appliance (or the burner for an appliance) within specifications as dictated by the customer or consumer rather than training the user.

6 Claims, 6 Drawing Sheets

CONSTANT EFFICIENCY CONTROLLER

RELATED APPLICATIONS

This application is a continuation of U.S. patent application Ser. No. 15/085,536, filed on Mar. 30, 2016, which claims priority to and the benefit of U.S. Provisional Patent Application No. 62/140,153, filed on Mar. 30, 2015, the entire contents of which are hereby incorporated by reference.

TECHNICAL FIELD

The subject matter relates to a controller for heating operations.

BACKGROUND

In the present invention pressure of the manifold gas pressure and the vacuum air pressure are continuously monitored or read at a designated exhaust point and makes adjustments to the flow of the air and gas to keep the efficiency of the appliance at a maximum to control the appliance (or the burner for an appliance) rather than training the user.

The subject invention also provides a method that helps eliminate repetitive, unnecessary, and sometimes harmful switching of the speed of the fan. As the switching of the motor speed may cause damage to various electrical components, such as relays and transistors, the method serves to prevent optimum switching of the fan to run at an optimum speed. The method also promotes proper operation of burner at its optimum state.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 4:
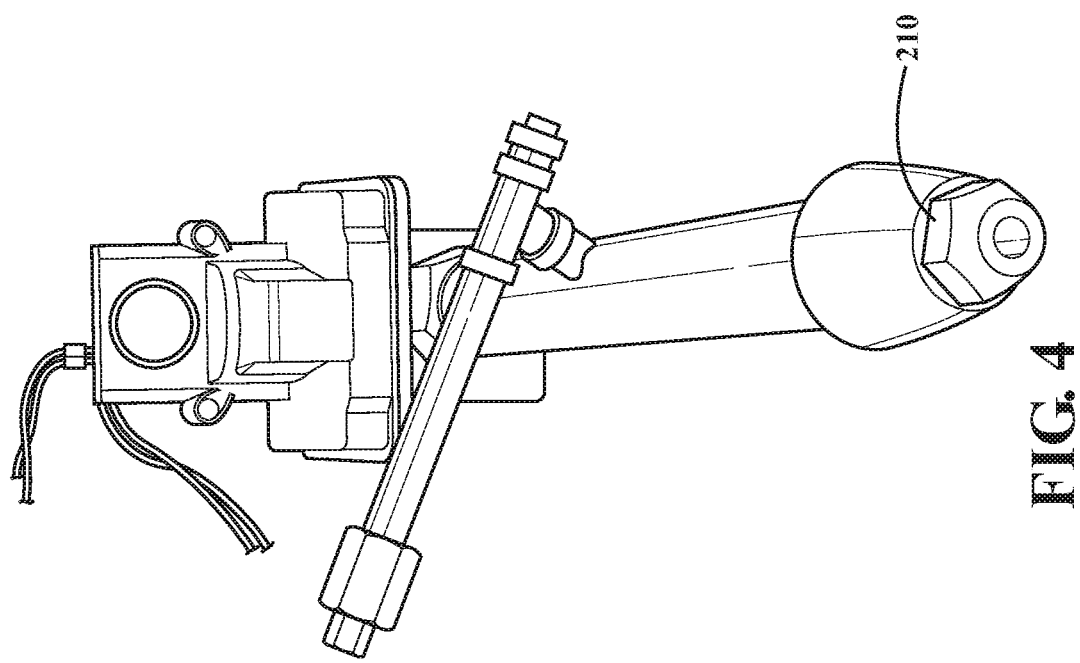
FIG. 4 is an elevated perspective view of a testing orifice for the system to set the flow rate equal for the customer's system specifications.

Referring to the Figures, a controller 10 in a system 20 is shown herein. This controller 10 is designed to provide a uniform output heat pattern as called for in a specific environment to have a constant efficiency of a burner (ideal for an operating point). The efficiency of the burner is determined by customer or consumer specifications and is tested, as shown in FIG. 4, so that it feeds back to those specifications.

Figure 1:
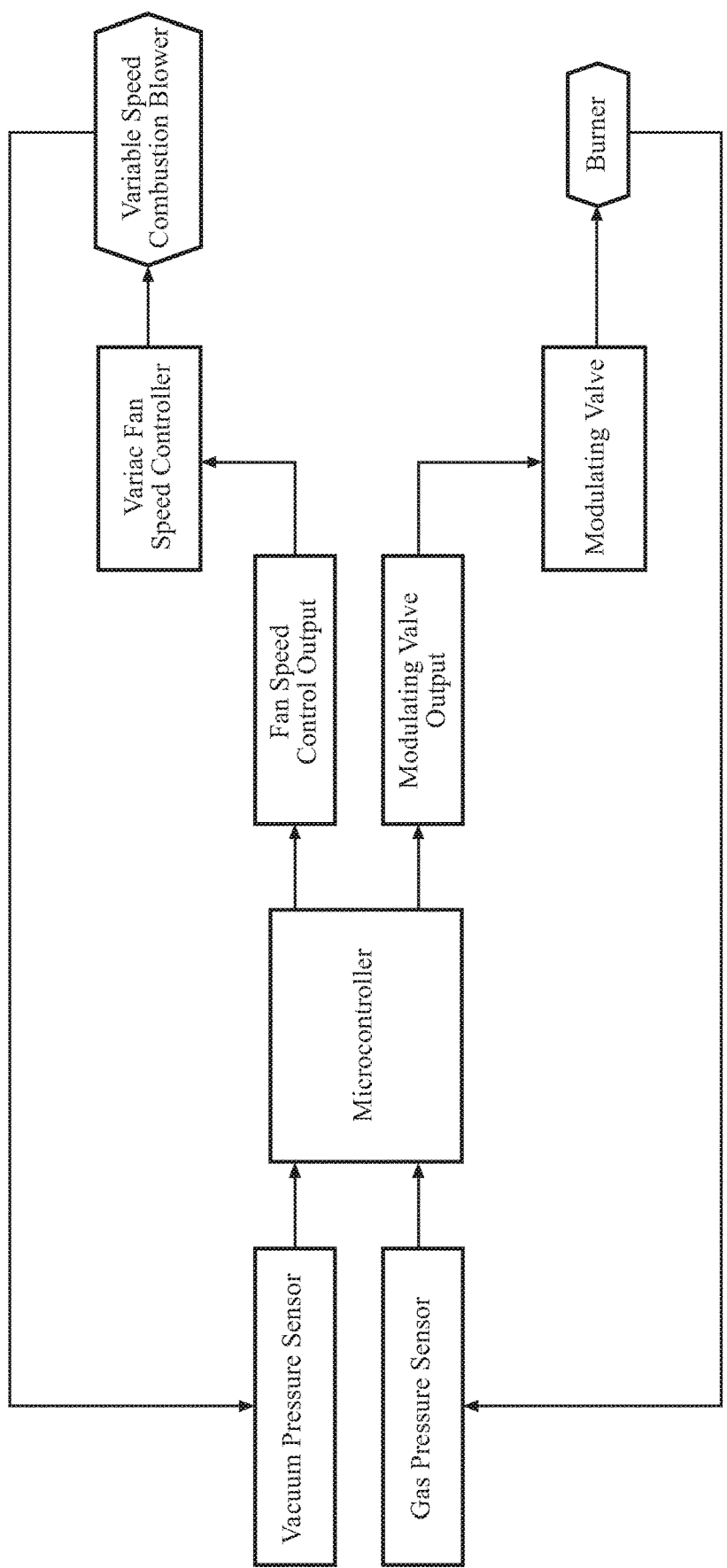
FIG. 1 is a schematic diagram showing a general representation of the system setup.

The controller 10 is designed, as shown in FIG. 1, to bring in two pressures (combustion air pressure and burner gas pressure) and control the fan speed to match an internal table of air pressures. The modulating valve adjusts the burner gas pressure to match the desired air/gas ratio that is programmed into the controller via a microprocessor, microcontroller or equivalent device. FIG. 1 is a general representation of the system setup.

Figure 2:
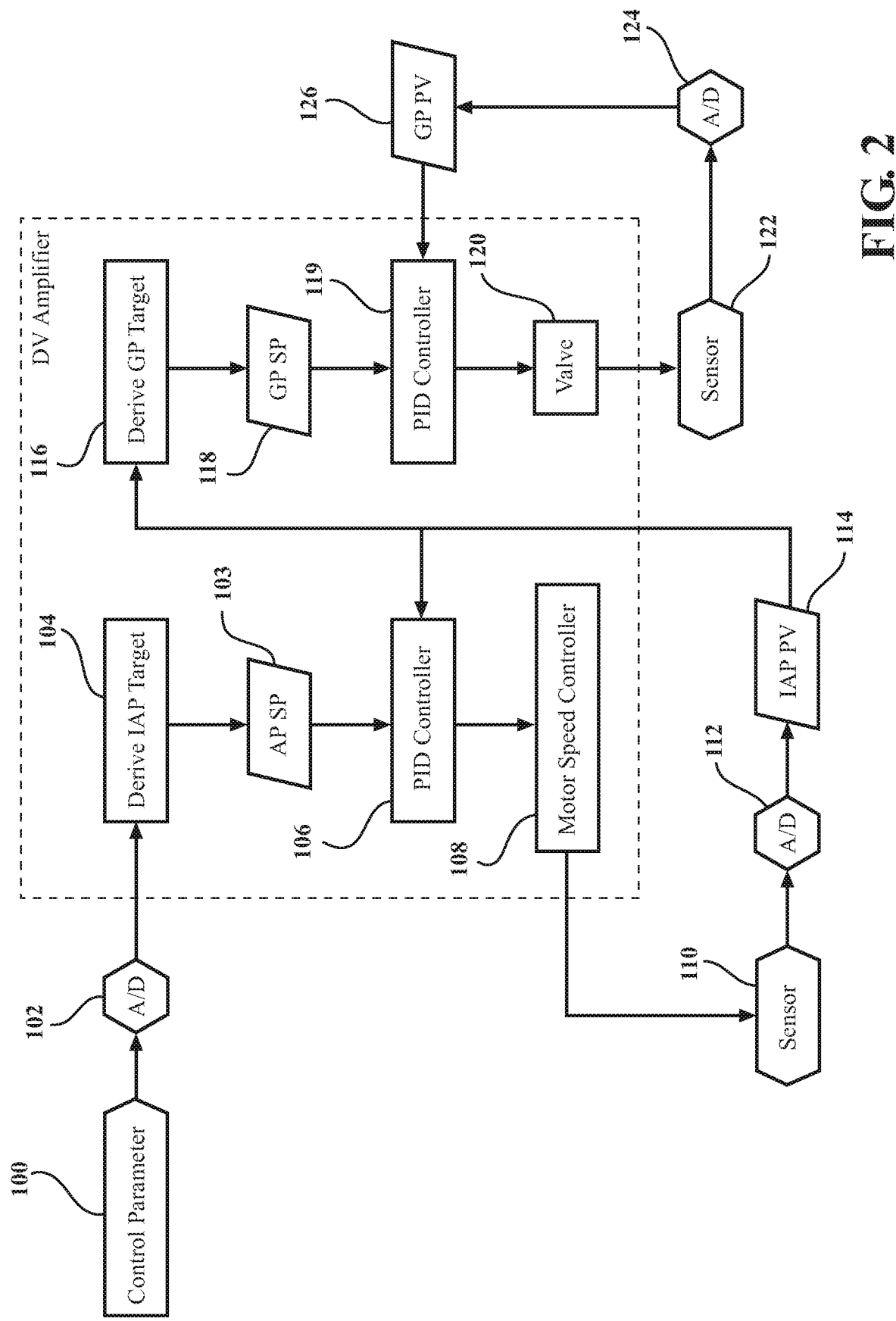
FIG. 2 is a more detailed schematic diagram of the controller in the system.

FIG. 2 provides more detail in the various steps. After testing, an analog control parameter 100 is fed into an A/D input 102 to provide a derived internal air pressure target 104 relating to speed 103 of the fan motor. A PID controller 106 compares the current air vacuum pressure with the derived internal target and sends a control voltage to the motor speed control board 108, thus changing the speed of the fan motor and the vacuum air pressure if not at the speed or pressure needed for optimum performance. A sensor 110 monitors vacuum air pressure (controlled by the motor speed) and transmits via another A/D input 112 to an internal air pressure device for a pressure value 114 which communicates with both the PID controller 106 (to determine if it is within specifications) and also a different portion of the microcontroller to derive the gas pressure target at 116.

Once this stage is reached, the derived gas pressure target is fed into the gas pressure specification 118 to generate a digital instruction in the PID controller 119 to control the valve 120. A sensor 122 is used at the output of the valve 120 to feed information back to the A/D input 124 into a gas pressure monitor 126 for the valve, where the monitor 126 feeds back into the PID controller 119.

Figure 3:
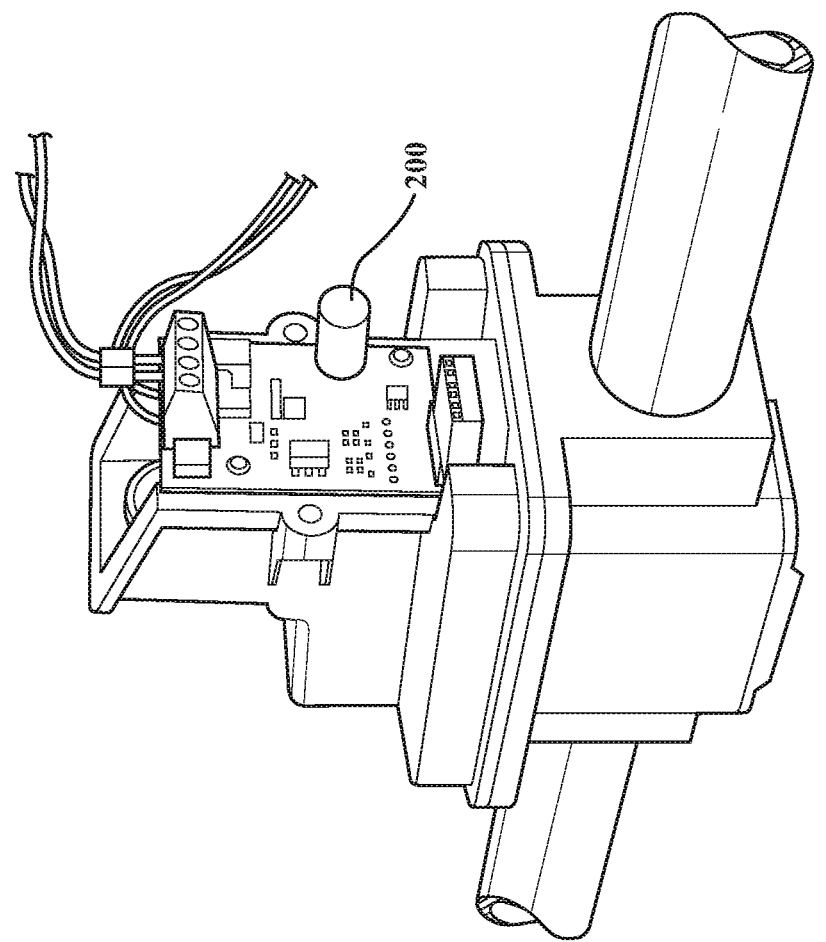
FIG. 3 is an elevated perspective view of the gas modulating valve for burner gas pressure in the system.
Figure 6:
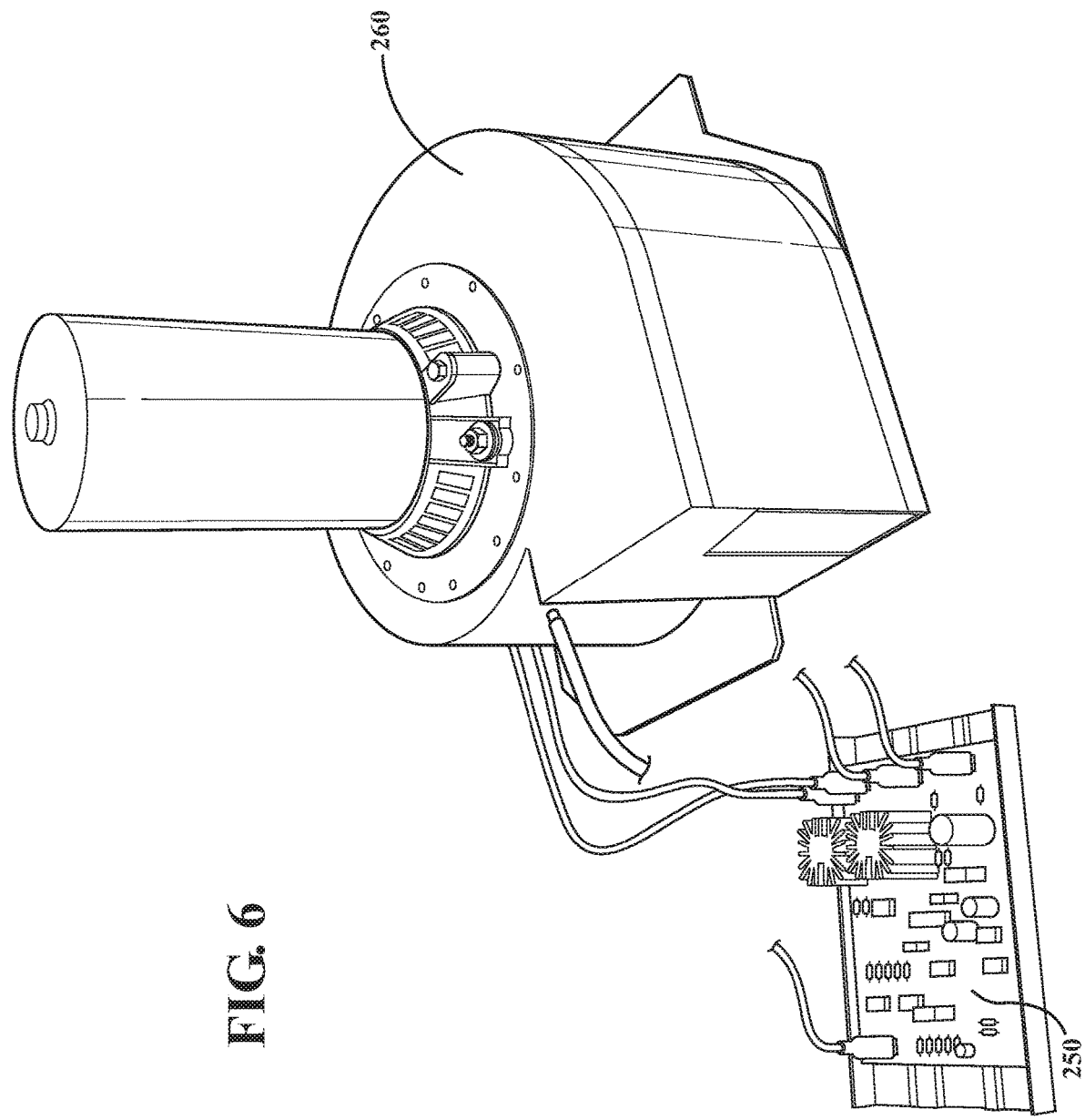
FIG. 6 is an elevated perspective view of a variac variable speed fan control board and variable speed combustion fan.
Figure 8:
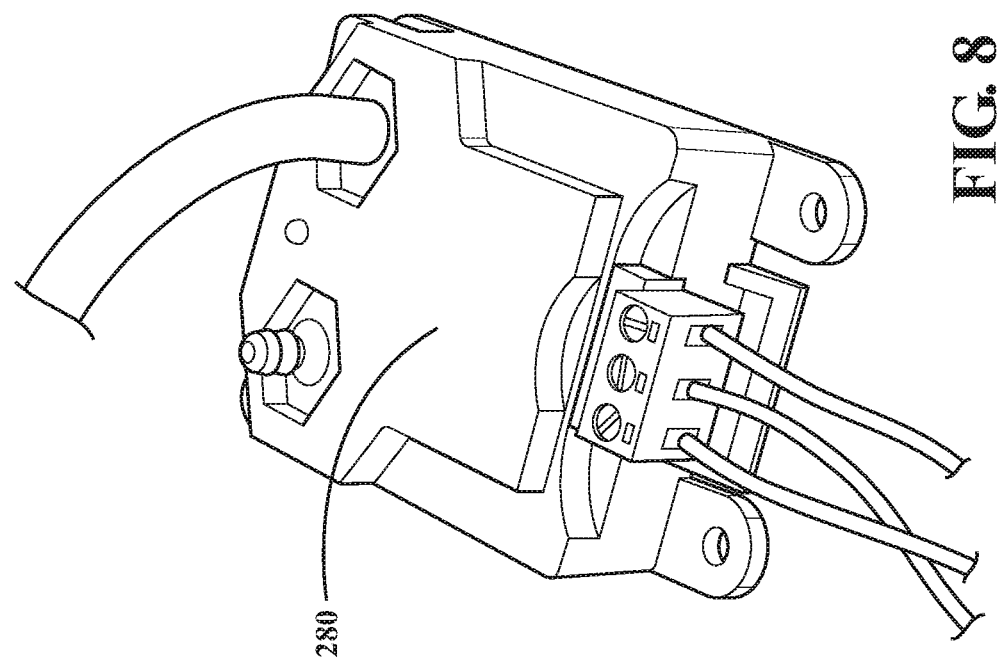
FIG. 8 is an elevated perspective view of a 0"-2" w. c. vacuum air pressure sensor in the system as described.
Figure 7:
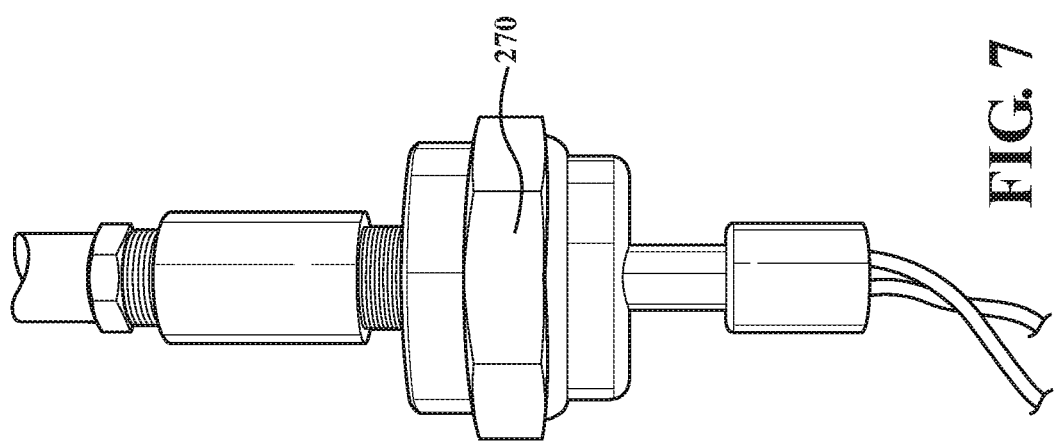
FIG. 7 is an elevated perspective view of a 0" to 4" w. c. gas pressure sensor in the system as described.

In operation, the system and controller controls a gas modulating valve 200 (FIG. 3), a control board 250 and variable speed combustion fan 260 (FIG. 6) as monitored by a water column gas pressure sensor 270 (FIG. 7) and a water column vacuum air pressure sensor 280 (FIG. 8). As shown in FIG. 3, a gas modulating valve 200, such as that supplied by Maxitrol under the model number EXA40 PV-7 or similar devices, modulates the burner gas pressure. An example of a 0-4" water column gas pressure gauge is shown in FIG. 7, and was purchased as a ProSense gauge identified as P356-5026, C24. The water column vacuum air pressure sensor 280 of FIG. 8 was purchased as a ProSense product DPTA-20.

FIG. 4 illustrates an orifice 210 used in testing to set the flow rate equal to the customer's system specifications. Each customer sets their own optimum performance specifications. The invention herein takes that information and produces the derived gas pressure target, fan motor speed (or air pressure target), and any other information generated as described above.

Figure 5:
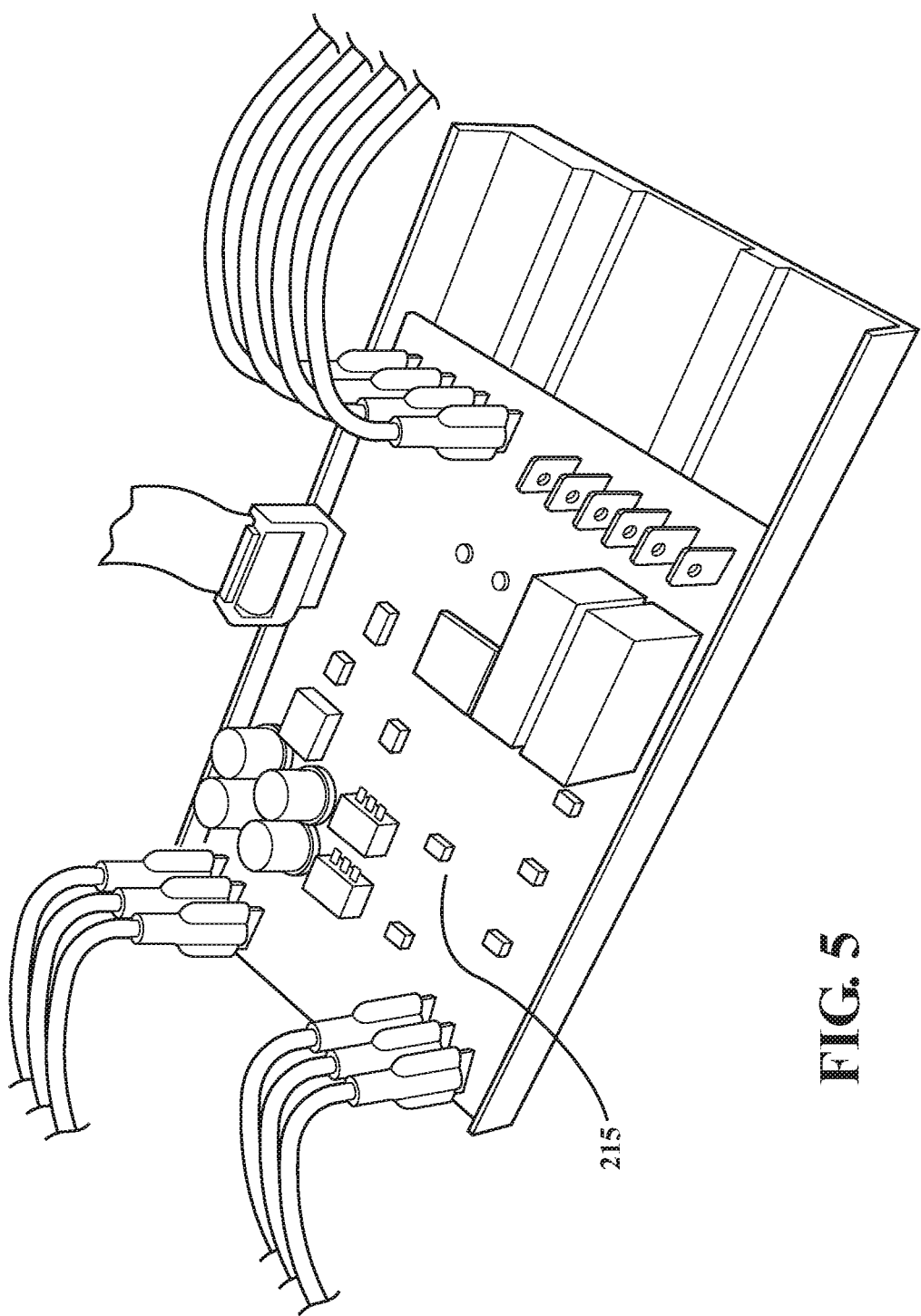
FIG. 5 is an elevated perspective view of a controller connected to all relevant input and output signals.

The circuit 10 shown can provide a number of advantages. The components of the circuit 10 are preferably supported by one or more printed circuit boards. The printed circuit board 215 (FIG. 5) provides electrical connections between the components and includes the microcontroller. FIG. 5 illustrate a controller connection to all relevant input and output signals. The circuit is suited for providing voltage control signals to the other printed circuit boards for the gas modulating valve (FIG. 3) and the variac and the variable speed fan controller (FIG. 6) to control the variable speed combustion fan 260, as well as reading the sensors 270 and 280. However, those skilled in the art will appreciate other uses for the circuit 10 described herein.

The present invention has been described herein in an illustrative manner, and it is to be understood that the terminology which has been used is intended to be in the nature of words of description rather than of limitation. Many modifications and variations of the invention are possible in light of the above teachings.

What is claimed is:

1. A circuit for a heating appliance connected to a fuel source, said circuit comprising:
    at least one fuel passageway coupled to the fuel source;
    a valve in communication with the at least one fuel passageway and configured to modulate the pressure of the fuel in said at least one fuel passageway;
    at least one air passageway;
    a fan in communication with the at least one air passageway, said fan including a variable speed motor configured to manipulate the fan to regulate a vacuum air pressure within the at least one air passageway;
    a fuel pressure sensor configured to measure a fuel pressure within the at least one fuel passageway;
    an air pressure sensor configured to measure a vacuum air pressure within the at least one air passageway;
    a controller in communication with said variable speed motor of the fan and said valve, said controller configured to adjust the speed of said variable speed motor and to adjust a position of said valve;
    a testing device configured to determine a target fuel pressure and a target air pressure to achieve a desired air to fuel ratio as defined in an optimum performance specification provided by the manufacturer of the heating appliance; and
    a signal generator in communication with said controller, said signal generator configured to indicate a signal to the controller representative of the fuel pressure measured by said fuel pressure sensor and/or the vacuum air pressure measured by said air pressure sensor;
    wherein said controller is configured to compare said fuel pressure measured by said fuel pressure sensor to said target fuel pressure and/or to compare said vacuum air pressure measured by said air pressure sensor to said target air pressure during operation of the heating appliance and to determine any variance between said target fuel pressure or target air pressure as determined by said testing device; and
    wherein the controller is configured to adjust the fan speed and/or the valve in response to any variance of the target fuel pressure and target air pressure to the fuel pressure and vacuum air pressure to achieve the desired air to gas ratio as defined in the optimum performance specification.

2. The circuit for a heating appliance of claim 1, wherein the testing device is an orifice.

3. The circuit for a heating appliance of claim 1, wherein the fuel pressure sensor comprises a water column gas pressure sensor.

4. The circuit for a heating appliance of claim 1, wherein the air pressure sensor comprises a water column vacuum air pressure sensor.

5. The circuit for a heating appliance of claim 1, wherein said controller comprises a first controller and a second controller;
    wherein said first controller is in communication with said variable speed motor of said fan and configured to adjust said speed of said variable speed motor; and
    wherein said second controller is in communication with said valve and configured to adjust said position of said valve to adjust said position of said valve.

6. The circuit for a heating appliance of claim 5, wherein said signal generator comprises a first A/D input and a second A/D input;
    wherein said first A/D input is in communication with said air pressure sensor and said first controller, said first A/D input configured to transmit said vacuum air pressure measured by said air pressure sensor to said first controller; and
    wherein said second A/D input is in communication with said fuel pressure sensor and said second controller, said second A/D input configured to transmit said fuel pressure measured by said fuel pressure sensor to said first second controller.

* * * * *

UNITED STATES PATENT AND TRADEMARK OFFICE
CERTIFICATE OF CORRECTION

PATENT NO. : 11,313,558 B2
APPLICATION NO. : 16/456947
DATED : April 26, 2022
INVENTOR(S) : John James Schlachter et al.

It is certified that error appears in the above-identified patent and that said Letters Patent is hereby corrected as shown below:

In the Claims

Claim 6, Column 4, Line 39, please delete "first second controller" and replace with -- second controller --

Signed and Sealed this
Fifth Day of July, 2022

Katherine Kelly Vidal
*Director of the United States Patent and Trademark Office*